United States Patent
Ben-Ari

(10) Patent No.: US 8,331,885 B1
(45) Date of Patent: Dec. 11, 2012

(54) PREDICTIVE WAKE-UP OF BASEBAND CIRCUITRY

(75) Inventor: Daniel Ben-Ari, Moshav Zur Natan (IL)

(73) Assignee: Marvell International Ltd., Hamilton (BM)

( * ) Notice: Subject to any disclaimer, the term of this patent is extended or adjusted under 35 U.S.C. 154(b) by 232 days.

(21) Appl. No.: 12/887,514

(22) Filed: Sep. 22, 2010

Related U.S. Application Data

(60) Provisional application No. 61/263,658, filed on Nov. 23, 2009.

(51) Int. Cl.
*H04B 1/04* (2006.01)
*H04B 1/38* (2006.01)

(52) U.S. Cl. ..................... 455/127.5; 455/574
(58) Field of Classification Search .............. 455/574, 455/127.5
See application file for complete search history.

(56) References Cited

U.S. PATENT DOCUMENTS

| | | | |
|---|---|---|---|
| 6,301,297 B1* | 10/2001 | Russo | 375/222 |
| 2004/0264396 A1* | 12/2004 | Ginzburg et al. | 370/311 |
| 2009/0175360 A1* | 7/2009 | Soni et al. | 375/241 |

OTHER PUBLICATIONS

Mobile Industry Processor Interface (MIPI) Alliance, "MIPI Alliance Specification for DigRF v4'", draft version 1.00.00, revision 0.03, Dec. 15, 2009.
Mobile Industry Processor Interface (MIPI) Alliance, "MIPI Alliance Specification for Dual Mode 2.5G/3G Baseband/RFIC Interface", draft version 3.09.05, revision 0.02, Dec. 7, 2009.

\* cited by examiner

*Primary Examiner* — Temesgh Ghebretinsae
*Assistant Examiner* — Gennadiy Tsvey

(57) ABSTRACT

A method in a mobile communication terminal includes accepting a data payload at a known input rate for transmission by baseband circuitry having a known wake-up delay. Based on the known input rate and the known wake-up delay, a point in time is predicted, at which the data payload will have been only partially accepted for transmission, such that activation of the baseband circuitry at the predicted point in time will cause the baseband circuitry to be active upon complete arrival of the data payload. The baseband circuitry is activated to process the data payload at the predicted point in time.

17 Claims, 2 Drawing Sheets

PREDICTIVE WAKE-UP OF BASEBAND CIRCUITRY

CROSS-REFERENCE TO RELATED APPLICATIONS

This application claims the benefit of U.S. Provisional Patent Application 61/263,658, filed Nov. 23, 2009, whose disclosure is incorporated herein by reference.

FIELD OF THE DISCLOSURE

The present invention relates generally to baseband processing, and particularly to methods and systems for activation of baseband processing circuitry.

BACKGROUND

DigRF is a family of specifications that define interfaces between Radio Frequency Integrated Circuits (RFICs) and Baseband Integrated Circuits (BBICs), for example in mobile communication devices. The DigRF specifications are developed and published by the Mobile Industry Processor Interface (MIPI) alliance. DigRF interfaces are specified, for example, in "MIPI Alliance Specification for DigRF v4," draft version 1.00.00, revision 0.03, Dec. 15, 2009, and in "MIPI Alliance Specification for Dual Mode 2.5G/3G Baseband/RFIC Interface," draft version 3.09.05, revision 0.02, Dec. 7, 2009, which are incorporated herein by reference. In the context of the present patent application and in the claims, the term "DigRF specification" refers collectively to any and all DigRF specifications and their variants and extensions, unless specifically noted otherwise.

The description above is presented as a general overview of related art in this field and should not be construed as an admission that any of the information it contains constitutes prior art against the present patent application.

SUMMARY

An embodiment that is described herein provides a method, which includes accepting a data payload in a mobile communication terminal. The data payload is accepted at a known input rate for transmission by baseband circuitry having a known wake-up delay. Based on the known input rate and the known wake-up delay, a point in time is predicted, at which the data payload will have been only partially accepted for transmission, such that activation of the baseband circuitry at the predicted point in time will cause the baseband circuitry to be active upon complete arrival of the data payload. The baseband circuitry is activated to process the data payload at the predicted point in time.

In some embodiments, predicting the point in time includes accepting a notification that a predefined portion of the data payload has been accepted, and setting the point in time at a predefined time interval following the notification. In an embodiment, accepting the data payload includes accumulating the data payload in a First-In First-Out (FIFO) memory, and accepting the notification includes detecting that a fill threshold set on the FIFO memory has been crossed. In another embodiment, setting the point in time includes triggering a counter to measure the predefined time interval in response to the notification.

In some embodiments, the method includes, after activating the baseband circuitry, waiting the wake-up delay and then transmitting the processed data payload using the activated baseband circuitry. In an embodiment, transmitting the processed data payload includes transferring the processed data payload to a Radio Frequency Integrated Circuit (RFIC) in accordance with a DigRF specification. In a disclosed embodiment, predicting the point in time includes maintaining the baseband circuitry inactive after a portion of the data payload has been accepted for transmission. In another embodiment, the data payload conforms to a given Radio Access Technology (RAT), and predicting the point in time includes setting the predicted point in time responsively to the given RAT.

There is additionally provided, in accordance with an embodiment that is described herein, apparatus including an input interface, a wake-up predictor and a baseband activator. The input interface is configured to accept a data payload at a known input rate for transmission by baseband circuitry having a known wake-up delay. The wake-up predictor is configured to predict, based on the known input rate and the known wake-up delay, a point in time at which the data payload will have been only partially accepted for transmission, such that activation of the baseband circuitry at the predicted point in time will cause the baseband circuitry to be active upon complete arrival of the data payload. The baseband activator is configured to activate the baseband circuitry for processing the data payload at the predicted point in time.

In some embodiments, the wake-up predictor and the baseband activator are included in a single wake-up circuit. In some embodiments, a mobile communication terminal includes the disclosed apparatus. In some embodiments, a chipset for processing signals in a mobile communication terminal includes the disclosed apparatus.

The present invention will be more fully understood from the following detailed description of the embodiments thereof, taken together with the drawings in which:

DETAILED DESCRIPTION OF EMBODIMENTS

Wireless communication terminals often support a power-saving mode, in which some of the terminal's hardware is deactivated in order to conserve battery power. Terminals operating in accordance with the DigRF specifications, for example, support SLEEP and STALL modes for this purpose. The SLEEP mode is typically used when the terminal operates in Low Speed (LS) mode and no active data frames are present. The STALL mode is typically used when the terminal operates in High Speed (HS) mode, between HS bursts of data. Similar modes are defined in various other communication standards.

Embodiments that are described herein provide improved methods and devices for re-activating ("waking-up") baseband circuitry in a wireless transmitter upon exit from a power-saving mode. In some embodiments, the transmitter accepts a data payload for transmission while the transmitter's baseband circuitry is deactivated, e.g., in a power-saving mode. The input rate at which the data payload is accepted by the transmitter is known. The baseband circuitry has a certain wake-up delay, which is also known. The disclosed wake-up techniques cause the transmitter's baseband circuitry to be ready for operation at a time that closely matches the complete arrival of the data payload. The baseband circuitry is activated at the optimal time (for example before a data payload is completely received), accounting for the known input rate and wake-up delay, thus reducing both latency and power consumption.

In some embodiments, a wake-up unit in the transmitter uses the known input rate of the data payload and the known wake-up delay of the baseband circuitry to predict an optimal point in time for activating the baseband circuitry. The predicted point in time is selected to occur when the data payload has been only partially accepted at the transmitter, and such that activation of the baseband circuitry at that point in time will cause the baseband circuitry to be active as soon as the data payload has completely arrived. The wake-up unit then activates the baseband circuitry at the predicted point in time.

It is possible in principle to activate the baseband circuitry as soon as the data payload begins to arrive (and thus possibly wake up the baseband circuitry too soon and unnecessarily increase power consumption), or only after the data payload arrives in full (and therefore add unnecessary latency). Unlike such sub-optimal schemes, the predictive wake-up techniques described herein enable the baseband circuitry of the transmitter to be active and ready for transmission immediately upon complete arrival of the data payload, accounting for both the input rate at which the data payload is accepted and the wake-up delay of the baseband circuitry. As a result, both power consumption and transmission latency are reduced.

Figure 1:
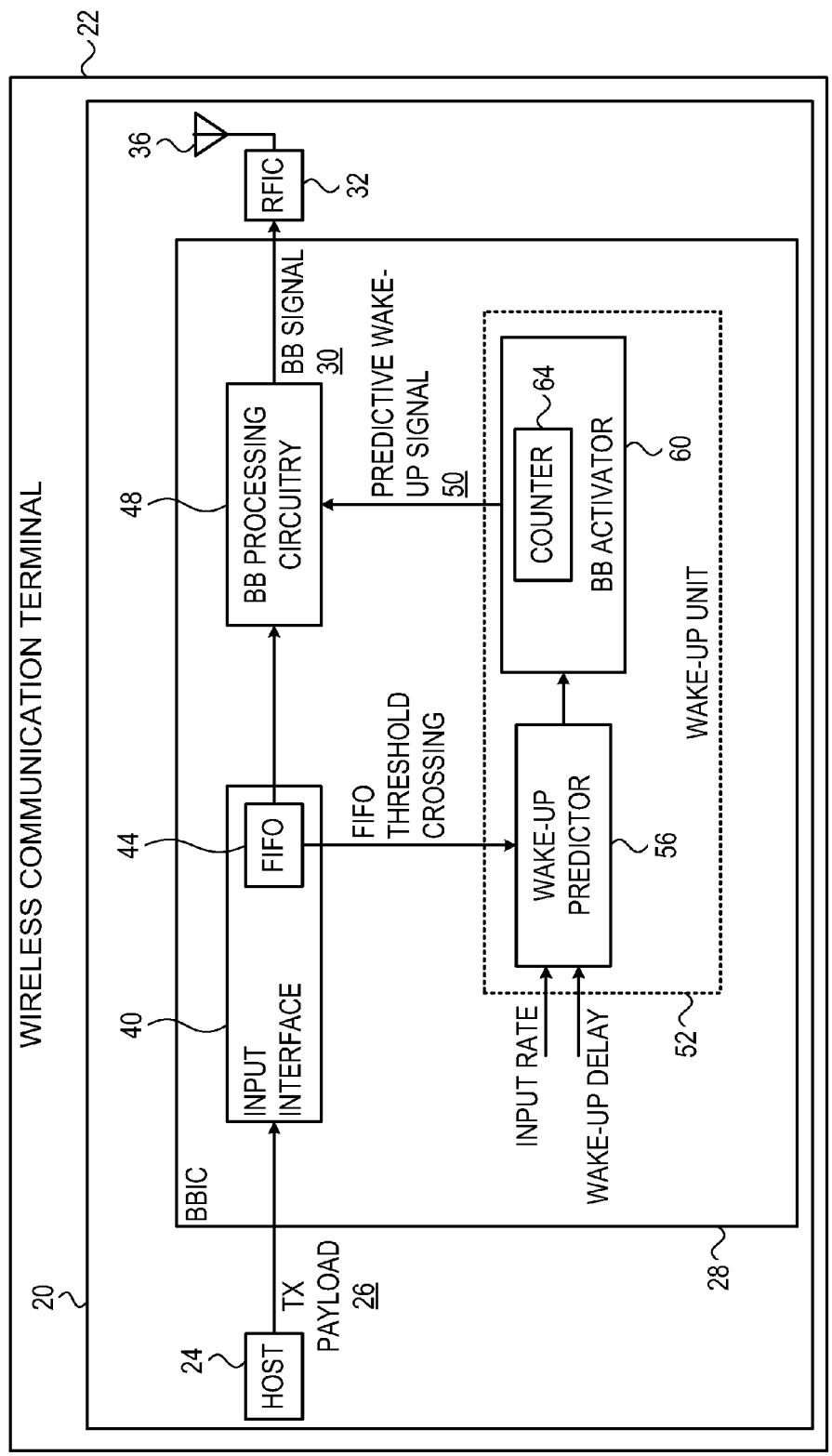
FIG. 1 is a block diagram that schematically illustrates a wireless transmitter, in accordance with an embodiment that is described herein.

FIG. 1 is a block diagram that schematically illustrates a wireless transmitter 20, in accordance with an embodiment that is described herein. In the present example, transmitter 20 comprises an uplink transmitter that is comprised in a wireless communication terminal 22, such as a mobile phone. In an example embodiment, transmitter 20 operates in accordance with the Evolved Universal Terrestrial Radio Access (E-UTRA) standard, also referred to as Long-Term Evolution (LTE). In alternative embodiments, transmitter 20 may operate with any other suitable communication standard or protocol, such as Global System for Mobile communications (GSM) or Wideband Code-Division Multiple Access (WCDMA). Although the embodiments described herein refer mainly to uplink transmission, the disclosed techniques are applicable to downlink transmitters, as well.

Transmitter 20 comprises a host processor 24, a Baseband Integrated Circuit (BBIC) 28 and a Radio Frequency Integrated Circuit (RFIC) 32. Host 24 produces a data payload 26 for transmission (e.g., over a wireless channel) and provides the data payload to BBIC 28. The BBIC applies baseband (BB) processing to the data payload, so as to produce a modulated digital BB signal 30. The BB signal is provided to RFIC 32, which converts the signal to RF and transmits the RF signal to a receiver (not shown) via an antenna 36. In some embodiments, the interface between BBIC 28 and RFIC 32 operates in accordance with the DigRF specifications, cited above.

In the embodiment of FIG. 1, BBIC 28 comprises an input interface 40, which accepts the data payload from host 24. The interface between host 24 and BBIC 28 is typically a high-speed interface, and the data payload arrives over this interface in a specified number of high-speed bursts. Input interface 40 comprises a First-In-First-Out (FIFO) memory 44, which buffers the incoming data payload.

BBIC 28 comprises suitable BB processing circuitry 48 (sometimes referred to as BB circuitry for brevity), which processes data payload 26 so as to produce modulated BB signal 30. The BB circuitry accepts the data payload that is buffered in FIFO 44, processes the data payload, and provides the resulting BB signal to RFIC 32. The BBIC typically performs functions such as modulation and digital filtering, and comprises various hardware modules for this purpose, such as digital processing circuitry, clock circuits, error correction coding, framing, Phase-Locked Loops (PLLs), line drivers and/or any other appropriate analog or digital hardware.

BBIC 28 supports a power-saving mode, in which at least part of BB circuitry 48 is intermittently deactivated in order to reduce the power consumption of transmitter 20. In the present example, BB circuitry 48 is activated and deactivated using a predictive wake-up signal 50. Typically, the BB circuitry is activated whenever a data payload is provided from host 24 for transmission, and deactivated after the payload has been processed and provided to RFIC 32. In some embodiments, BB circuitry 48 has a certain wake-up delay, e.g., for allowing PLL synchronization or any other wake-up task. The wake-up delay is defined as the time period from the moment that the BB circuitry is activated using the predictive wake-up signal until the moment that the BB circuitry is active and ready for processing. In an embodiment, the wake-up delay is on the order of several nanoseconds when the PLL is ON, and up to ~100-200 microseconds when the PLL is OFF. Alternatively, the disclosed techniques can be used with any other suitable wake-up delay. The wake-up delay is assumed to be known a-priori.

In some embodiments, BBIC 28 comprises a wake-up unit 52, which activates and deactivates BB processing circuitry 48 using predictive wake-up signal 50. Unit 52 predicts a suitable point in time at which to activate the BB circuitry. In an embodiment, the predicted point in time is set to an optimal time that minimizes the period during which the BB circuitry is active while avoiding unnecessary latency. In the present example, unit 52 comprises a wake-up predictor 56, which predicts the activation time, and a BB activator 60, which activates BB circuitry 48 at the appropriate time by controlling the predictive wake-up signal. In alternative embodiments, unit 52 may have any other suitable configuration. Typically, predictor 56 and activator 60 are implemented as part of a single wake-up unit or circuit in transmitter 28.

In an embodiment, unit 52 predicts the point in time for activating the BB circuitry based on two known factors: The input rate at which the data payload arrives from host 24, and the wake-up delay of BB circuitry 48. (Other factors, not shown, may also be considered when predicting the activation point in time.) In some embodiments, unit 52 comprises a counter 64, which counts a certain wait period when triggered. In an example embodiment, the counter is based on the DigRF symbol clock. In addition, FIFO 44 in input interface 40 is configured with a fill threshold, which is crossed when the FIFO is filled to a predefined level (i.e., when a predefined portion of a data payload is accepted from the host).

In these embodiments, upon detecting that the FIFO fill threshold has been crossed, unit 52 triggers counter 64 to count the wait period. When the wait period ends, as indicated by the counter, BB activator 60 in unit 52 activates the BB circuitry using the predictive wake-up signal. The length of the wait period is typically set according to the known input rate and wake-up delay. The timing of this activation process is seen in detail in FIG. 2 below.

The configuration of transmitter 20 in FIG. 1 is an example configuration, which is chosen solely for the sake of clarity. In alternative embodiments, any other suitable transmitter configuration can also be used. Some transmitter elements that are not mandatory for understanding of the disclosed techniques have been omitted from the figure for the sake of clarity.

The different elements of transmitter 20, including input interface 40, BB circuitry 48 and wake-up unit 52 (and in particular predictor 56 and activator 60), are typically implemented using dedicated hardware, such as using one or more Application-Specific Integrated Circuits (ASICs) and/or Field-Programmable Gate Arrays (FPGAs) and/or other suitable dedicated hardware processing devices. Alternatively, some transmitter elements may be implemented using software running on programmable hardware, or using a combination of hardware and software elements. In some embodiments, some or all of the elements of transmitter 20 are fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
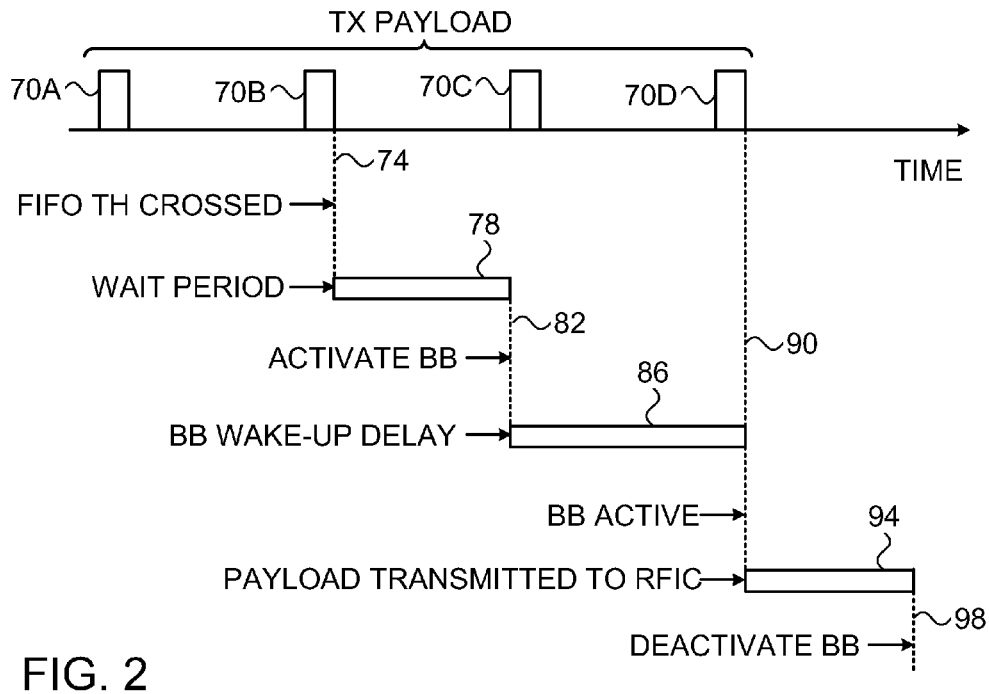
FIG. 2 is a timing diagram that schematically illustrates a method for predictive wake-up of baseband circuitry, in accordance with an embodiment that is described herein.

FIG. 2 is a timing diagram that schematically illustrates a method for predictive wake-up of baseband circuitry 48 in BBIC 28, in accordance with an embodiment that is described herein. FIG. 2 shows the BB circuitry activation process, which is carried out by wake-up unit 52. In the present example, the data payload arrives in four bursts 70A ... 70D. The input data rate of the data payload (e.g., the number of bursts per payload and the spacing between them) is known in advance and in typically dependent on the Radio Access Technology (RAT) that is used by the transmitter. LTE systems, for example, support several data bandwidths having different data rates. The following table summarizes the burst period as a function of the LTE Bandwidth.

| LTE Bandwidth [MHz] | Data Rate [Mbit/sec] | Burst size [Bytes] | Burst Period [micro sec] |
| --- | --- | --- | --- |
| 20 | 30.72 | 60 | 60 × 8/30.72 = 15.625 |
| 15 | 23.04 | | 60 × 8/23.04 = 20.833 |
| 10 | 15.36 | | 31.25 |
| 5 | 7.68 | | 62.5 |
| 3 | 3.84 | | 125 |
| 1.4 | 1.92 | | 250 |

In alternative embodiments, the data payload may arrive in any other suitable number of bursts having any suitable spacing, or even in a single burst, as long as the input rate at which the data payload arrives is known.

In the example of FIG. 2, as well as in many other practical scenarios, the data payload arrives over a relatively long period of time. It is therefore undesirable to activate the BB circuitry immediately when the data payload begins to arrive. The predictive process described below delays the activation of the BB circuitry, and therefore reduces the power consumption of the transmitter.

As explained above, FIFO 44 is configured with a fill threshold, which is crossed when the amount of data in the FIFO exceeds a predefined portion. When the fill threshold is crossed, input interface 40 outputs a threshold crossing indication to wake-up unit 52. In the present example, the fill threshold is crossed when the first two bursts of the data payload are buffered in the FIFO. As can be seen in FIG. 2, the fill threshold is crossed at a time 74, after bursts 70A and 70B arrive from the host.

In response to the threshold crossing indication, wake-up unit 52 triggers counter 64 to count a wait period 78. The wait period ends at a time 82, which is the predicted point in time for activating BB circuitry 48. In response to termination of wait period 78 at time 82 (as indicated by counter 64), wake-up unit 52 activates BB circuitry 48 using the predictive wake-up signal. After a wake-up delay 86, at a time 90, the BB circuitry is active and ready for operation.

As can be seen in the figure, time 90 (at which the BB circuitry is ready) is congruent with the time at which the last burst of the payload data (burst 70D) arrives. Thus, during a period 94, the BB circuitry processes the data payload and transmits the resulting BB signal to RFIC 32. When transmission from BBIC 28 to RFIC 32 ends, at a time 98, wake-up unit 52 deactivates BB circuitry 48 using the wake-up signal until arrival of the next data payload. (In some embodiments, FIFO 44 is configured with an additional threshold, which indicates that the FIFO contains less than a predefined amount of data. This additional threshold can be used to trigger deactivation of the BB circuitry.)

Wake-up unit 52 predicts the activation time of the BB circuitry (time 82) such that the time at which the BB circuitry is ready matches the time at which the data payload is fully accepted for BB processing. This matching provides optimal latency, since the data payload is processed as soon as it is accepted. In alternative embodiments, unit 52 activates the BB circuitry such that it is ready for processing slightly after the data payload is fully accepted. This embodiment causes slight degradation in latency, but on the other hand leaves some tolerance for timing variations.

When using the predictive activation scheme described herein, the BB circuitry is typically not activated immediately when the data payload begins to arrive but only later, at a time that ensures that the BB circuitry will be ready when the payload arrives in full. Thus, the transmitter power consumption is reduced.

Wait period 78 and the value of the FIFO fill threshold are defined so as to provide the desired predicted point in time for activating the BB circuitry, based on the known input rate of the data payload and the known wake-up delay of the BB circuitry.

In an example WCDMA embodiment, the DigRF v4 frame size is twelve bytes. Transmission from the BBIC to the RFIC is performed in 24-bit words at a rate of 3.84 MHz, which is equivalent to 32.5 DigFR v4 symbols at a rate of 124.8 MHz. The FIFO fill threshold is set to any value between eight and twelve bytes. For a fill threshold of eight bytes, the wait period counted by counter 64 is set to thirty-four DigRF symbols. For a fill threshold of twelve bytes, the wait period is set to zero or to a single DigRF symbol. The additional threshold set on FIFO 44 (which initiates deactivation of the BB circuitry) is set to zero. In this example, the wake-up delay is assumed to be zero. In a real-life scenario, however, with PLL ON the wake-up delay will typically last for several DigRf v4 symbols. The wait period will therefore be 34-wake-up delay. Thus, when the wake-up delay is four symbols, for example, the wait period will be configured to thirty DIgRF symbols.

In an example LTE embodiment, the DigRF v4 frame size is sixty bytes. Transmission from the BBIC to the RFIC is performed in 24-bit words, with a data rate that is equivalent to the LTE bandwidth. For a LTE bandwidth of 20 MHz, for example, the rate is 30.72 Mbit/sec, which is equivalent to approximately four DigFR v4 symbols at a rate of 124.8 MHz. For a LTE bandwidth of 10 MHz, the data rate is 15.26 Mbit/sec. The FIFO fill threshold is set to sixty bytes, i.e., a full frame. The wait period counted by counter 64 is set to zero. In one embodiment, the additional threshold set on FIFO 44 (which initiates deactivation of the BB circuitry) is set to twenty-four bytes. In an alternative embodiment, For a LTE bandwidth of 3 MHz, the additional threshold is set to four bytes. In the above examples, The wake-up delay value is expected to be few symbols and starts at time 90 after receiving the whole burst (since the FIFO fill threshold is set to sixty bytes). The parameter values (e.g., input rate, wait period, wake-up delay and FIFO threshold values) in the above WCDMA and LTE embodiments are given purely by way of example. In alternative embodiments, any other suitable parameter values can also be used.

In some embodiments, transmitter 20 comprises two or more FIFO units similar to FIFO 44. For example, the transmitter may support multiple RATs and comprise a respective FIFO for buffering the data payloads of each RAT. As another example, separate FIFOs may be assigned for payloads carrying data transmissions and for payloads carrying control transmissions. In these embodiments, each FIFO is configured with a respective fill threshold. In some embodiments, different FIFOs may have different fill threshold values. Since each RAT is characterized by a respective input rate, it may be desirable to match the FIFO fill threshold to the RAT.

In an alternative embodiment, transmitter 20 may support multiple RATs with a single FIFO 44, by setting the value of the FIFO fill threshold according to the currently-used RAT. The transmitter may receive an explicit indication that identifies the currently-used RAT, or it may identify the currently-used RAT automatically by processing the accepted data payloads. Additionally or alternatively, wake-up unit 52 may set the value of the wait period counted by counter 64 according to the currently-used RAT.

Figure 3:
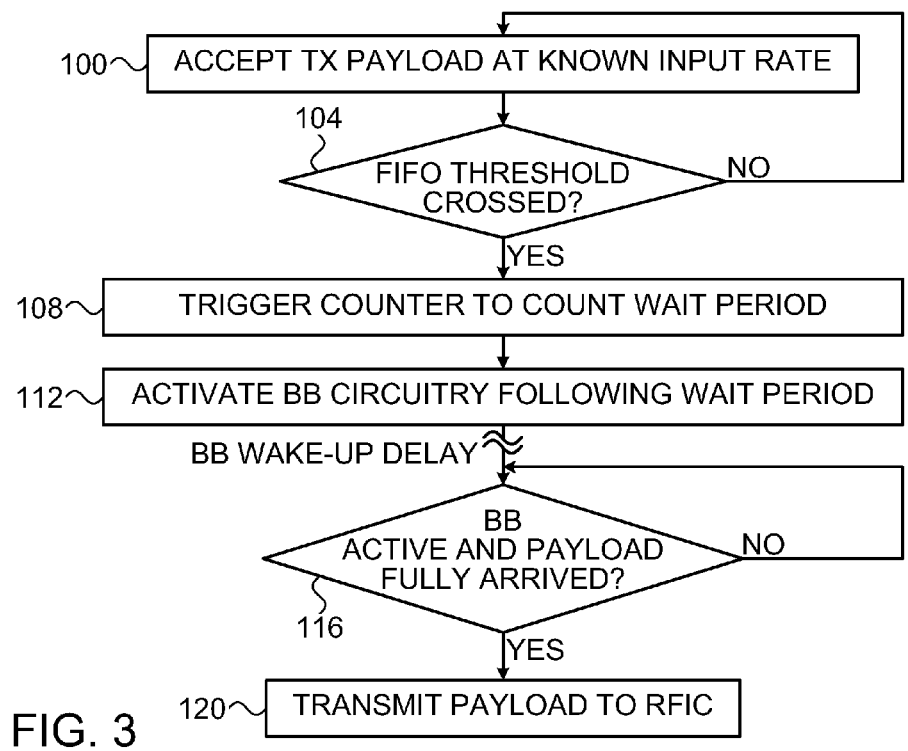
FIG. 3 is a flow chart that schematically illustrates a method for predictive wake-up of baseband circuitry, in accordance with an embodiment that is described herein.

FIG. 3 is a flow chart that schematically illustrates a method for predictive wake-up of BB circuitry 48 in transmitter 20, in accordance with an embodiment that is described herein. In alternative embodiments, other suitable methods may be employed to anticipate receipt of a data payload and predicatively wake up the BB circuitry.

The method of FIG. 3 begins at an input operation 100, with input interface 40 accepting a data payload from host 24 at a known input rate. At a threshold checking operation 104, input interface 40 checks whether the fill threshold set over FIFO 44 is exceeded. If the fill threshold is not yet exceeded, the method loops back to input operation 100 above.

In response to detecting that the fill threshold of FIFO 44 is crossed, wake-up unit 52 triggers counter 64 to count the wait period, at a counter triggering operation 108. In response to detecting that the wait period has ended (e.g., upon detecting that counter 64 expired), wake-up unit 52 activates BB circuitry 48, at an activation operation 112. As explained above, the activation time is determined by the wake-up unit so as to match (i) the time at which the BB circuitry is ready to (ii) the time at which the data payload arrives in full.

Following the wake-up delay of the BB circuitry, the transmitter checks whether the BB circuitry is active and ready, and whether the data payload has been fully accepted, at a ready checking operation 116. If these conditions are met, the BB circuitry processes the data payload, and BBIC 28 transmits the resulting BB signal to RFIC 32, at a transmission operation 120. The RFIC in turn processes the BB signal so as to produce a RF signal, and transmits the RF signal via antenna 36 to a receiver.

Although the embodiments described herein mainly address transmitters of wireless communication terminals, the methods and systems described herein can also be used in other applications, such as in communication equipment that is specified for low power consumption (e.g., for performance reasons, environmental reasons or for any other reason), such as routers, modems or television receivers.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   in a mobile communication terminal, accepting a data payload at a known input rate for transmission by baseband circuitry having a known wake-up delay;
   accepting a notification that a predefined portion of the data payload has been accepted;
   based on the known input rate and the known wake-up delay, predicting a point in time that is set at a predefined time interval following the notification, at which the data payload will have been only partially accepted for transmission and such that activation of the baseband circuitry at the predicted point in time will cause the baseband circuitry to be active upon complete arrival of the data payload; and
   activating the baseband circuitry to process the data payload at the predicted point in time.

2. The method according to claim 1, wherein accepting the data payload comprises accumulating the data payload in a First-In First-Out (FIFO) memory, and wherein accepting the notification comprises detecting that a fill threshold set on the FIFO memory has been crossed.

3. The method according to claim 1, wherein predicting the point in time comprises triggering a counter to measure the predefined time interval in response to the notification.

4. The method according to claim 1, comprising, after activating the baseband circuitry, waiting the wake-up delay and then transmitting the processed data payload using the activated baseband circuitry.

5. The method according to claim 4, wherein transmitting the processed data payload comprises transferring the processed data payload to a Radio Frequency Integrated Circuit (RFIC) in accordance with a DigRF specification.

6. The method according to claim 1, wherein predicting the point in time comprises maintaining the baseband circuitry inactive after a portion of the data payload has been accepted for transmission.

7. The method according to claim 1, wherein the data payload conforms to a given Radio Access Technology (RAT), and wherein predicting the point in time comprises setting the predicted point in time responsively to the given RAT.

8. Apparatus, comprising:
   an input interface, which is configured to accept a data payload at a known input rate for transmission by baseband circuitry having a known wake-up delay;
   a wake-up predictor, which is configured to accept a notification that a predefined portion of the data payload has been accepted and to predict, based on the known input rate and the known wake-up delay, a point in time that is set at a predefined time interval following the notification, at which the data payload will have been only partially accepted for transmission and such that activation of the baseband circuitry at the predicted point in time will cause the baseband circuitry to be active upon complete arrival of the data payload; and a baseband activator, which is configured to activate the baseband circuitry for processing the data payload at the predicted point in time.

9. The apparatus according to claim 8, comprising a First-In First-Out (FIFO) memory that is configured to accumulate the accepted data payload and to generate the notification responsively to detecting that a fill threshold set on the FIFO memory has been crossed.

10. The apparatus according to claim 8, comprising a counter, wherein the wake-up predictor is configured to set the point in time by triggering the counter to measure the predefined time interval in response to the notification.

11. The apparatus according to claim 8, comprising the baseband circuitry, which is configured, after being activated by the baseband activator, to transmit the processed data payload following the wake-up delay.

12. The apparatus according to claim 11, wherein the baseband circuitry is configured to transfer the processed data payload to a Radio Frequency Integrated Circuit (RFIC) in accordance with a DigRF specification.

13. The apparatus according to claim 8, wherein the baseband activator is configured to maintain the baseband circuitry inactive after a portion of the data payload has been accepted for transmission.

14. The apparatus according to claim 8, wherein the data payload conforms to a given Radio Access Technology (RAT), and wherein the wake-up predictor is configured to set the predicted point in time responsively to the given RAT.

15. The apparatus according to claim 8, wherein the wake-up predictor and the baseband activator are comprised in a single wake-up circuit.

16. A mobile communication terminal comprising the apparatus of claim 8.

17. A chipset for processing signals in a mobile communication terminal, comprising the apparatus of claim 8.

* * * * *